United States Patent
Nakagawa et al.

(10) Patent No.: US 11,247,482 B2
(45) Date of Patent: Feb. 15, 2022

(54) IMAGE PROCESSING APPARATUS, METHOD, AND PRODUCT FOR REDUCING COLOR UNEVENNESS BASED ON EDGE INFORMATION

(71) Applicant: CANON KABUSHIKI KAISHA, Tokyo (JP)

(72) Inventors: Junichi Nakagawa, Tokyo (JP); Yumi Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 16/929,792

(22) Filed: Jul. 15, 2020

(65) Prior Publication Data

US 2021/0031538 A1 Feb. 4, 2021

(30) Foreign Application Priority Data

Jul. 31, 2019 (JP) .............................. JP2019-141562

(51) Int. Cl.
*B41J 2/21* (2006.01)
*H04N 1/60* (2006.01)
(Continued)

(52) U.S. Cl.
CPC .......... *B41J 2/2139* (2013.01); *B41J 2/2056* (2013.01); *B41J 2/2146* (2013.01); *G06K 15/102* (2013.01);
(Continued)

(58) Field of Classification Search
CPC .......... H04N 1/00005; H04N 1/00015; H04N 1/00023; H04N 1/00068; H04N 1/00087; H04N 1/034; H04N 1/1951; H04N 1/2315; H04N 1/233; H04N 1/2346; H04N 1/40006; H04N 1/4015; H04N 1/40087;
(Continued)

(56) References Cited

U.S. PATENT DOCUMENTS 8,172,352 B2 * 5/2012 Okada ................. B41J 2/04543
347/11
8,743,420 B2 * 6/2014 Ishikawa .............. H04N 1/6041
358/1.9

(Continued)

FOREIGN PATENT DOCUMENTS

JP H10-13674 A 1/1998

*Primary Examiner* — Scott A Rogers
(74) *Attorney, Agent, or Firm* — Canon U.S.A., Inc. I.P. Division

(57) ABSTRACT

An image processing apparatus includes a processing unit that converts first input image data for a first region and second input image data for a second region to reduce a difference between first region recorded image density and second region recorded image density, and generates dot position data of a dot to be generated in each of the first and second regions based on the dot data after the conversion processing. The acquisition unit acquires edge information indicating a first object pixel edge of an image pixel for the first region and a second object pixel edge of an image pixel for the second region. Based on the acquired edge information, conversion and generation processing are performed in such a manner that a color signal of an edge pixel is increased/reduced to a degree lower than a degree to which a color signal of a non-edge object pixel is increased/reduced.

14 Claims, 10 Drawing Sheets

(51) Int. Cl.
| | |
|---|---|
| *H04N 1/401* | (2006.01) |
| *H04N 1/58* | (2006.01) |
| *H04N 1/00* | (2006.01) |
| *H04N 1/034* | (2006.01) |
| *H04N 1/195* | (2006.01) |
| *H04N 1/23* | (2006.01) |
| *H04N 1/40* | (2006.01) |
| *G06K 15/02* | (2006.01) |
| *G06K 15/10* | (2006.01) |
| *B41J 2/205* | (2006.01) |

(52) U.S. Cl.
CPC ..... *G06K 15/1877* (2013.01); *H04N 1/00005* (2013.01); *H04N 1/00015* (2013.01); *H04N 1/00023* (2013.01); *H04N 1/00068* (2013.01); *H04N 1/00087* (2013.01); *H04N 1/034* (2013.01); *H04N 1/1951* (2013.01); *H04N 1/233* (2013.01); *H04N 1/2315* (2013.01); *H04N 1/2346* (2013.01); *H04N 1/40006* (2013.01); *H04N 1/4015* (2013.01); *H04N 1/40087* (2013.01); *H04N 1/58* (2013.01); *H04N 1/605* (2013.01); *H04N 1/6027* (2013.01); *H04N 1/6041* (2013.01); *G06K 15/027* (2013.01); *H04N 1/6033* (2013.01)

(58) Field of Classification Search
CPC ........ H04N 1/58; H04N 1/6027; H04N 1/603; H04N 1/6033; H04N 1/6041; H04N 1/605; G06K 15/027; G06K 15/102; G06K 15/1877; B41J 2/205; B41J 2/2056; B41J 2/2132; B41J 2/2139; B41J 2/2146
See application file for complete search history.

(56) References Cited

U.S. PATENT DOCUMENTS 9,346,265 B2 * 5/2016 Tanase .................. B41J 2/2114
9,692,944 B2 * 6/2017 Goto ..................... B41J 2/2139

* cited by examiner

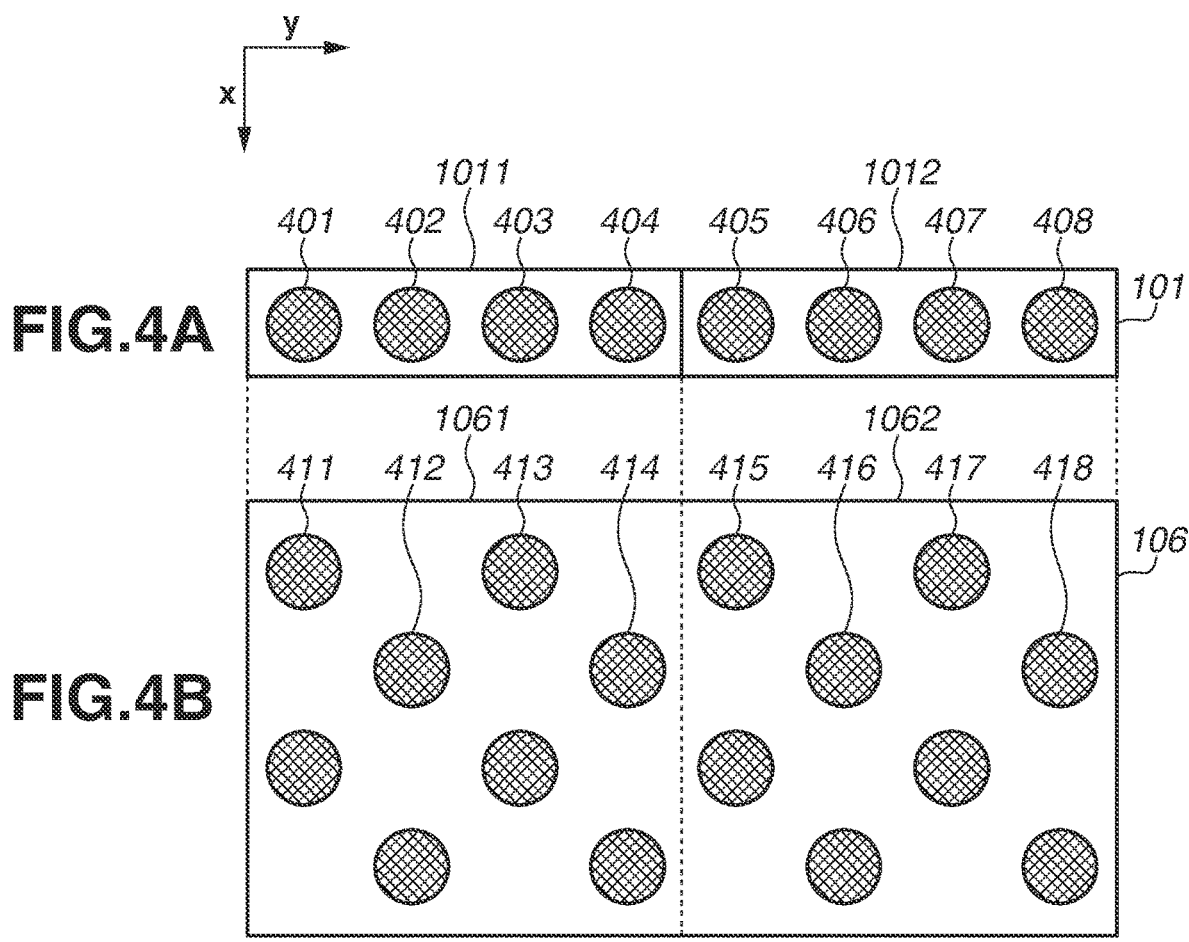

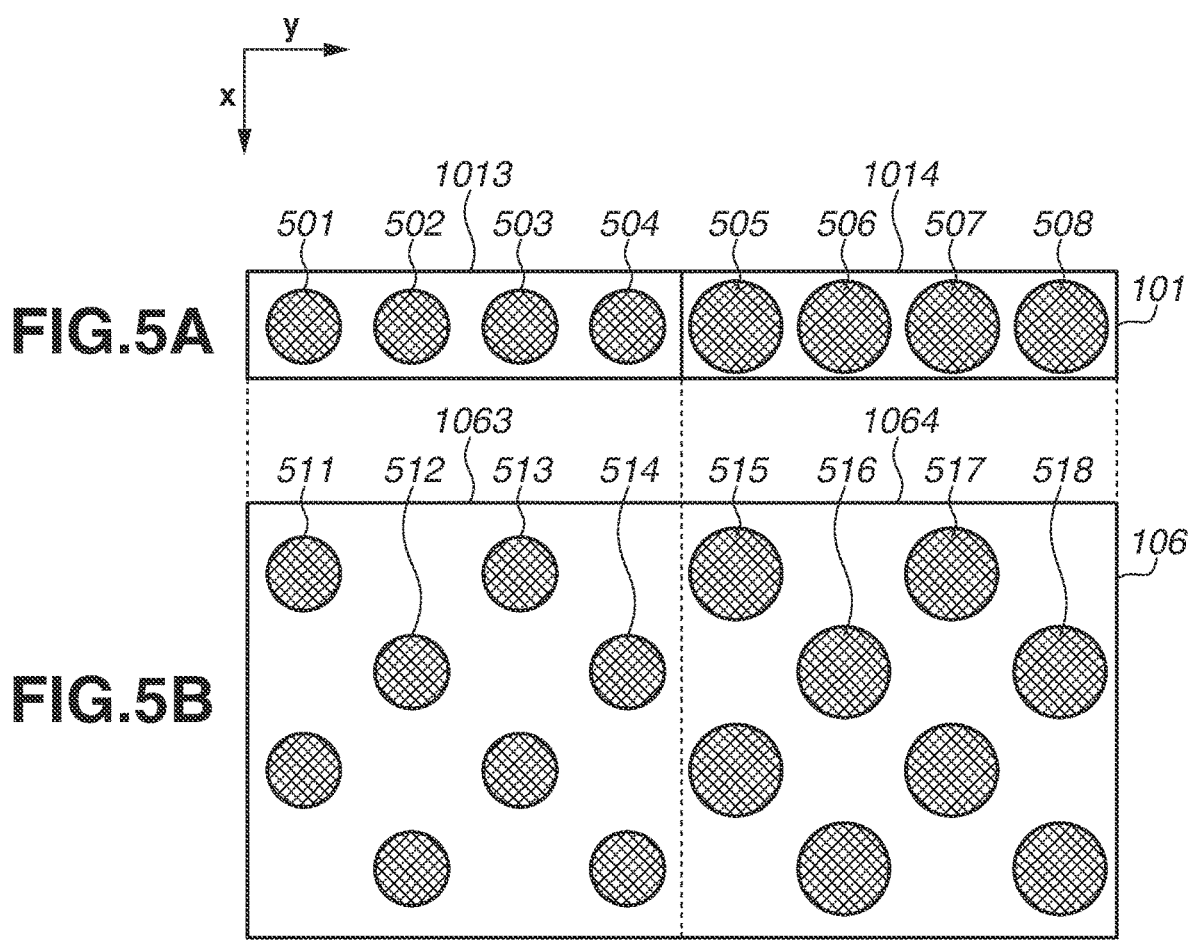

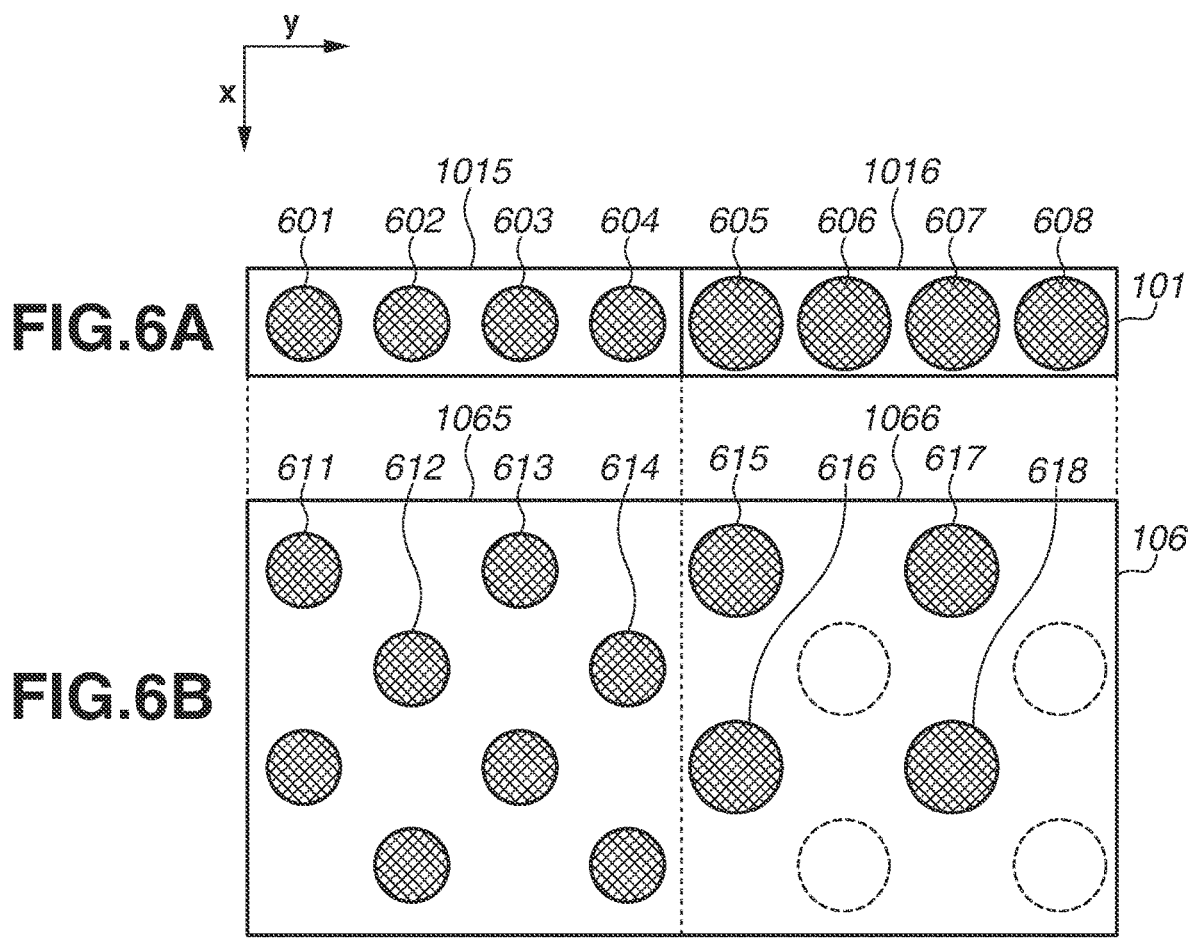
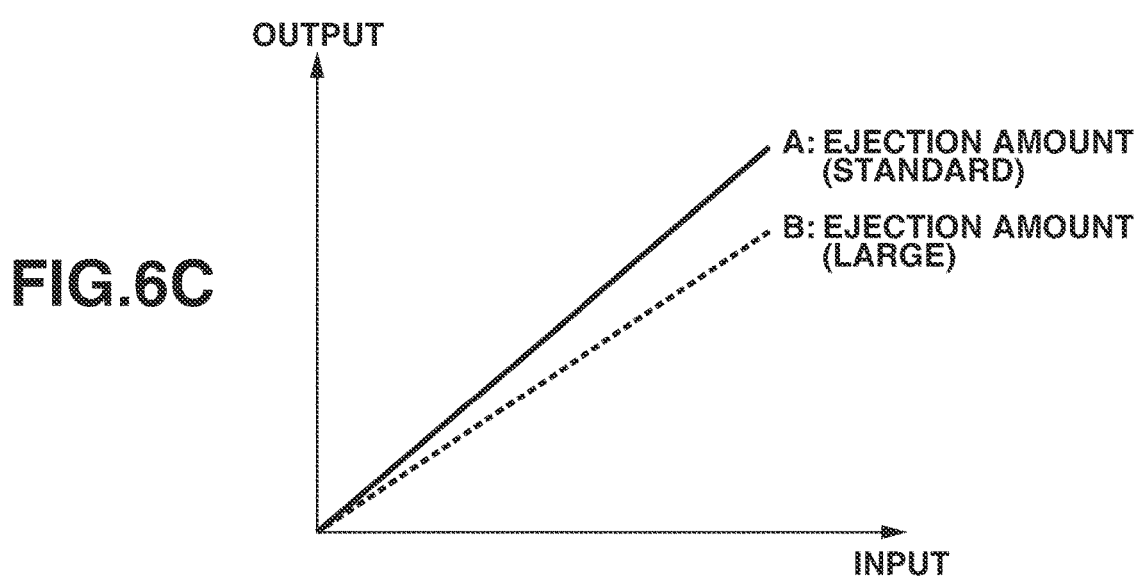

IMAGE PROCESSING APPARATUS, METHOD, AND PRODUCT FOR REDUCING COLOR UNEVENNESS BASED ON EDGE INFORMATION

BACKGROUND

Field

The present disclosure relates to an image processing apparatus, an image processing method, and a storage medium, and, more particularly, to image processing for reducing color unevenness due to a variation in ejection characteristic among a plurality of nozzles that ejects ink.

Description of the Related Art

Recording heads used in inkjet-type recording apparatuses may have a variation per nozzle in ejection characteristics, such as an amount per ink droplet ejected from a plurality of nozzles (hereinafter referred to as an ejection amount in the present disclosure) and an ejection direction thereof, due to a cause such as a manufacturing error. The presence of such a variation facilitates the occurrence of density unevenness in an image to be recorded.

Conventionally, it has been known to employ the head shading (HS) technique like the example discussed in Japanese Patent Application Laid-Open No. 10-13674 as processing for reducing such density unevenness. The HS technique is processing that makes a correction according to information regarding the ejection characteristic of each individual nozzle, and is processing that controls the driving pulse and corrects image data nozzle by nozzle. The method that corrects image data can reduce the density difference in an image to be recorded by increasing or reducing nozzle by nozzle the number of ink dots to be eventually recorded.

SUMMARY

According to an aspect of the present disclosure, an image processing apparatus is configured to perform image processing for recording an image in a first region on a recording medium using a first nozzle group including a part of a plurality of nozzles arranged in a nozzle array in which the plurality of nozzles are configured to provide ink, and to perform image processing for recording an image in a second region different from the first region using a second nozzle group including a nozzle different from the part of the plurality of nozzles in the first nozzle group. The image processing apparatus includes a processing unit configured to perform conversion processing to convert first input data of the image to be recorded in the first region and second input data of the image to be recorded in the second region to reduce a difference between a density of the image recorded in the first region using the first nozzle group with respect to an input of a predetermined color signal and a density of the image recorded in the second region using the second nozzle group with respect to the input of the predetermined color signal, and configured to perform generation processing for generating dot data indicating a position of a dot to be generated in each of the first region and the second region based on the dot data after the conversion processing, and an acquisition unit configured to acquire edge information indicating a pixel corresponding to a first edge of an object in the image to be recorded in the first region and indicating a pixel corresponding to a second edge of the object in the image to be recorded in the second region, wherein, based on the acquired edge information, the processing unit performs the conversion processing and the generation processing in such a manner that a color signal of an edge pixel corresponding to an edge is increased/reduced to a degree lower than a degree to which a color signal of a non-edge pixel corresponding to a non-edge of the object is increased/reduced.

Further features of the present disclosure will become apparent from the following description of exemplary embodiments with reference to the attached drawings.

BRIEF DESCRIPTION OF THE DRAWINGS

FIGS. 4A and 4B are schematic views illustrating nozzles and a dot layout on a recording medium.
FIGS. 5A and 5B are schematic views illustrating nozzles and a dot layout on the recording medium.
FIGS. 6A to 6C are schematic views illustrating nozzles and a dot layout on the recording medium.

DESCRIPTION OF THE EMBODIMENTS

In the following description, an exemplary embodiment of the present disclosure will be described with reference to the drawings. Adjusting the number of dots to be provided on a recording medium using the conventional head shading (HS) processing may impair linearity at the edge portion of a character or a line drawing, thereby resulting in the deterioration of the image quality. An image processing apparatus detects the edge portion, and performs such processing that a value of a pixel indicating non-recording is changed to a value indicating recording so as to reduce an influence of the processing for reducing the number of dots due to the HS processing at the detected edge portion.

Figure 1:
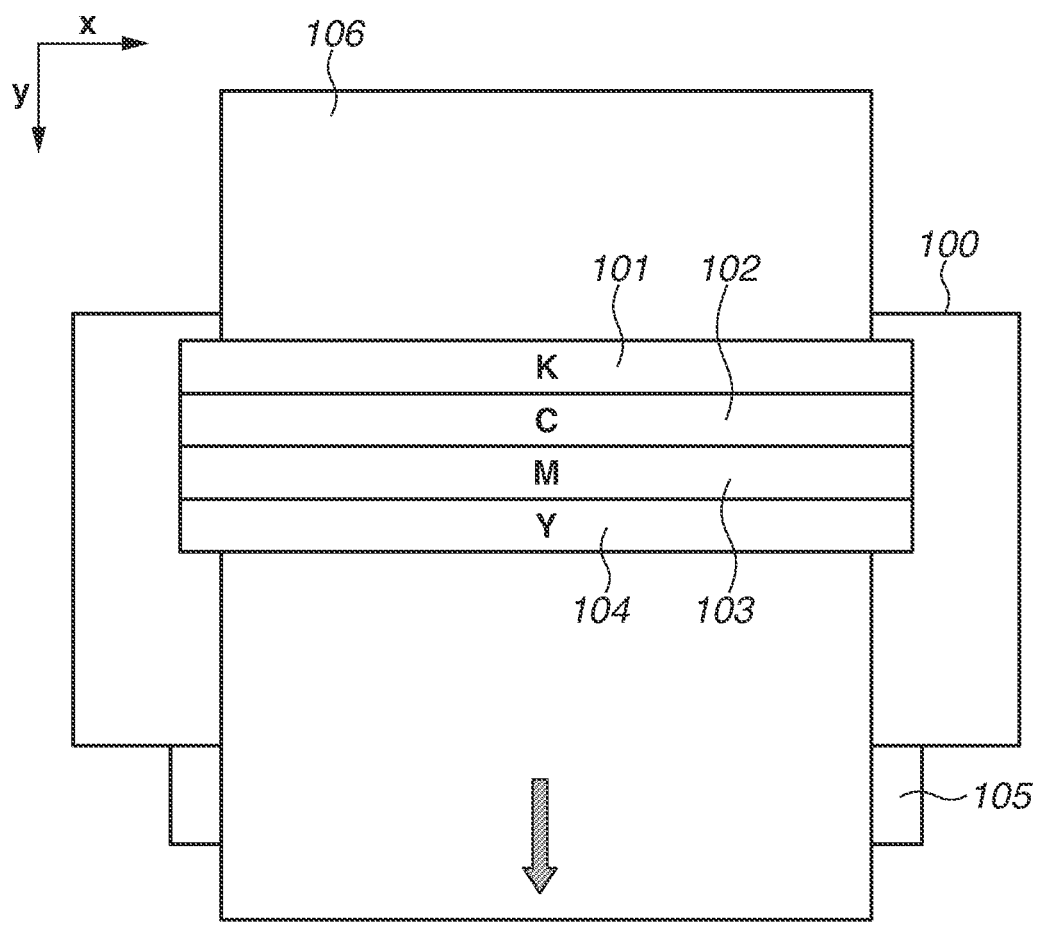
FIG. 1 is a schematic view of a printer.

FIG. 1 schematically illustrates a printer that is an inkjet recording apparatus according to the exemplary embodiment of the present disclosure. The printer according to the present exemplary embodiment is a full line-type recording apparatus, and includes recording heads 101 to 104 as illustrated in FIG. 1. A nozzle array corresponding to the width of a recording medium 106 and constructed by arraying a plurality of nozzles that ejects the same type of ink is arranged on each of the recording heads 101 to 104 in a y direction (a predetermined direction) at a pitch of 1200 dpi. The recording heads 101 to 104 are respective recording heads that eject black (K) ink, cyan (C) ink, magenta (M) ink, and yellow (Y) ink. The recording head according to the present exemplary embodiment is constructed by lining up the recording heads 101 to 104 that eject this plurality of types of ink in parallel with one another along an x direction as illustrated in FIG. 1.

A conveyance roller 105 and another not-illustrated roller rotate by a driving force of a motor (not-illustrated), by which the recording medium 106 is conveyed in the x direction intersecting the y direction in FIG. 1. While the recording medium 106 is being conveyed, an ejection operation according to recording data is performed from the plurality of nozzles on each of the recording heads 101 to 104 at a frequency corresponding to the speed at which the recording medium 106 is conveyed. As a result, dots in the respective colors are recorded in correspondence with the recording data at a predetermined resolution, thereby forming an image corresponding to one page of the recording medium 106.

The recording apparatus to which the present exemplary embodiment is applicable is not limited to the above-described full line-type apparatus. For example, the present exemplary embodiment is also applicable to a so-called serial-type recording apparatus, which carries out recording while causing the recording head to scan in the direction intersecting the direction in which the recording medium is conveyed. Further, the present exemplary embodiment is applied to the example including the recording head for each ink color, but the recording apparatus may be configured to eject a plurality of colors of ink from one recording head. Furthermore, the recording apparatus may be configured in such a manner that nozzle arrays corresponding to a plurality of colors of ink are arranged on one ejection substrate.

Figure 2:
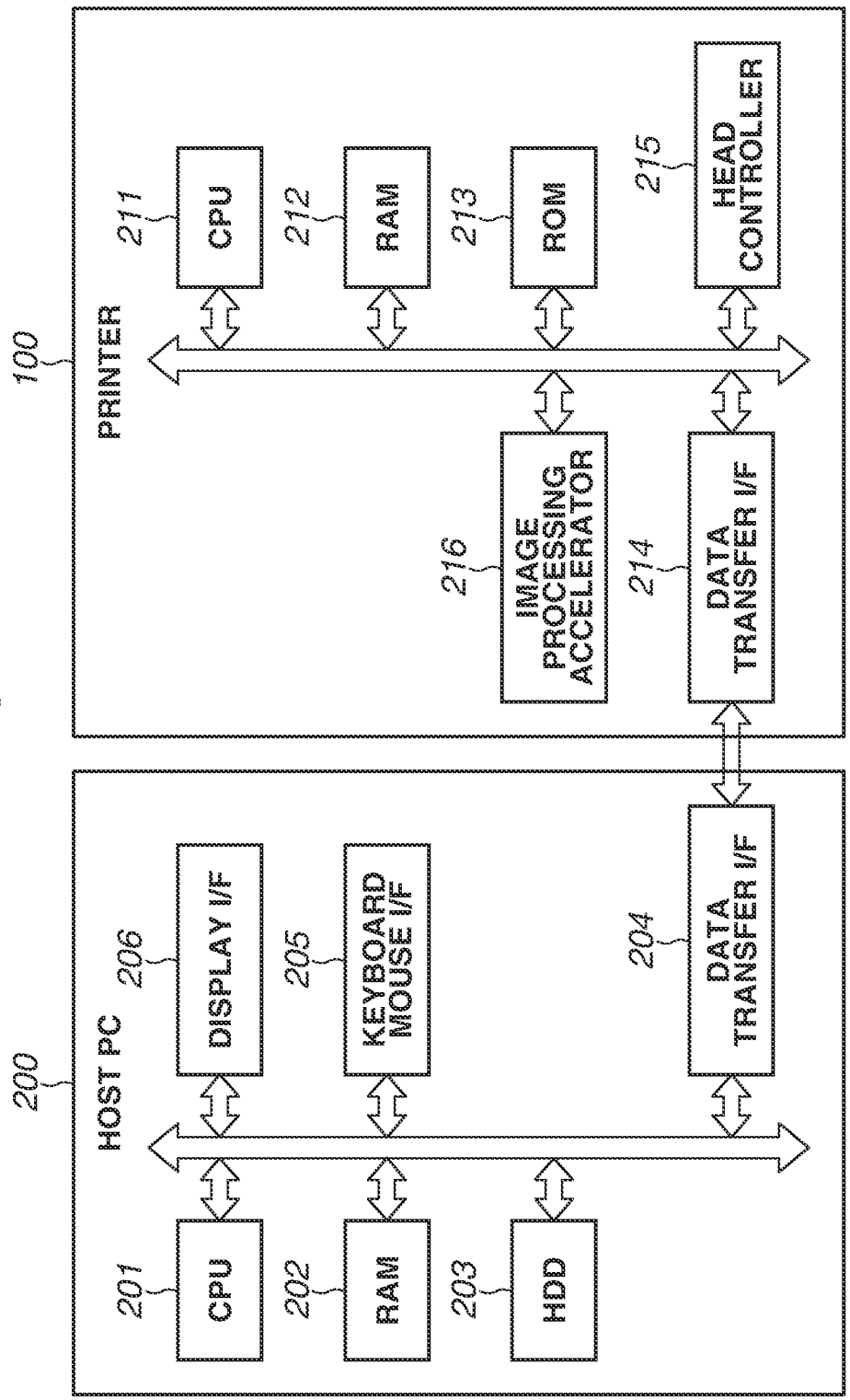
FIG. 2 is a block diagram of a recording system.

FIG. 2 is a block diagram illustrating a recording system according to the present exemplary embodiment. As illustrated in FIG. 2, this recording system includes the printer 100 illustrated in FIG. 1 and a personal computer (PC) 200 working as a host apparatus thereof.

The host PC 200 mainly includes the following components. A central processing unit (CPU) 201 performs processing according to programs stored in a random access memory (RAM) 202 and a hard disk drive (HDD) 203, which are storage units. The RAM 202 is a volatile storage, and temporarily stores the program and data therein. The HDD 203 is a nonvolatile storage, and stores the program and data therein. A data transfer interface (I/F) 204 controls the transmission/reception of data between the host PC 200 and the printer 100. Connection methods usable for this data transmission/reception include Universal Serial Bus (USB), the Institute of Electrical and Electronics Engineers (IEEE) 1394, a local area network (LAN), and the like. A keyboard and mouse I/F 205 is an I/F that controls human interface devices (HIDs) such as a keyboard and a mouse, and a user can feed input data via this I/F. A display I/F 206 controls a display on a display device (not illustrated).

On the other hand, the printer 100 mainly includes the following components. A CPU 211 performs processing according to each exemplary embodiment that will be described below, according to a program stored in a RAM 212 or a ROM 213. The RAM 212 is a volatile storage, and temporarily stores the program and data therein. The ROM 213 is a nonvolatile storage, and can store table data used in processing that will be described below, and the program therein.

A data transfer I/F 214 controls the transmission/reception of data between the printer 100 and the host PC 200. A head controller 215 supplies the recording data to each of the recording heads 101 to 104 illustrated in FIG. 1, and controls the ejection operation of the recording head. More specifically, the head controller 215 can be configured to read in a control parameter and the recording data from a predetermined address in the RAM 212. Then, when the CPU 211 writes the control parameter and the recording data into the above-described predetermined address in the RAM 212, the processing is started up by the head controller 215 and the ink is ejected from the recording head.

An image processing accelerator 216 is hardware capable of performing image processing at a higher speed than the CPU 211. More specifically, the image processing accelerator 216 is configured to read in a parameter and data required for the image processing from a predetermined address in the RAM 212. Then, when the CPU 211 writes the above-described parameter and data into the above-described predetermined address in the RAM 212, the image processing accelerator 216 is started up and predetermined image processing is performed on the above-described data. Each of image processes including quantization processing is performed by hardware processing by the image processing accelerator 216. The image processing accelerator 216 is not an essential component, and processing for generating the above-described table parameter and image processing may be realized only by the processing performed by the CPU 211 depending on the specifications of the printer 100 or the like.

Figure 3:
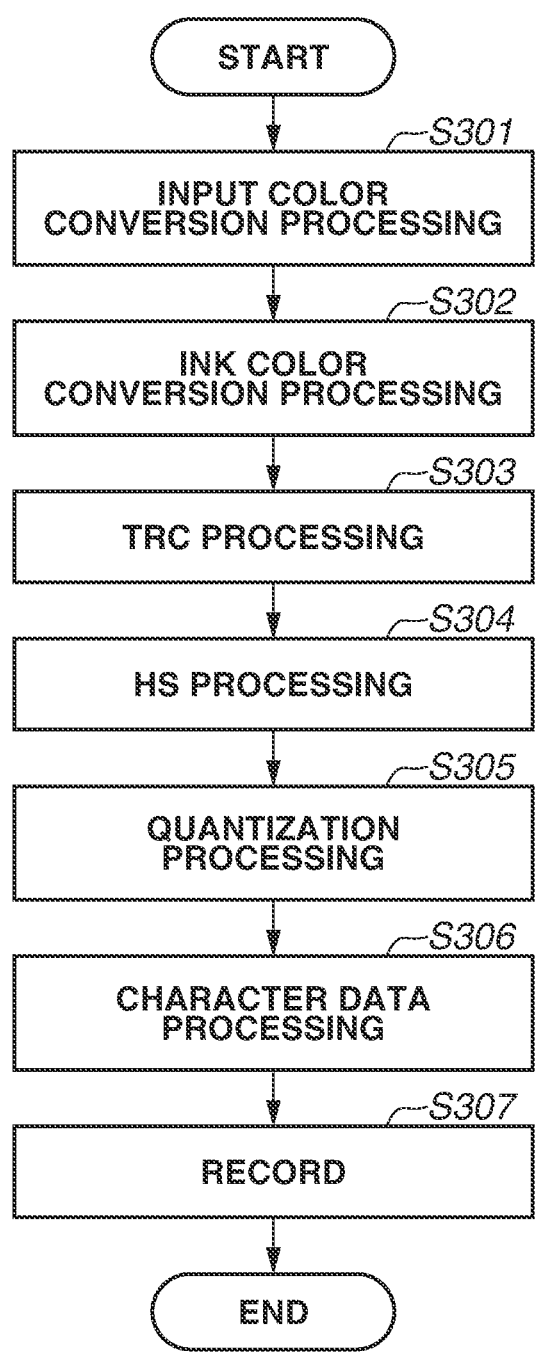
FIG. 3 is a flowchart illustrating an overall configuration of image processing.

Next, the overall configuration of the image processing according to the present exemplary embodiment will be described with reference to FIG. 3. First, in step S301, input color conversion processing is performed. At this time, input image data is converted into image data corresponding to the color gamut of the printer 100. In the present exemplary embodiment, the input image data is data indicating color coordinates (R, G, B) in color space coordinates such as standard Red-Green-Blue (sRGB), which are colors reproducible on the monitor. In the present example, the input image data, which is R, G, and B values represented by 8 bits for each of them, is converted into the image data (R', G, B') in compliance with the color gamut of the printer 100 by a method such as the matrix calculation processing or processing using a three-dimensional lookup table (LUT). In the present exemplary embodiment, the color conversion processing is performed by using the three-dimensional lookup table (3-D LUT) and using an interpolation calculation together therewith.

Next, in step S302, ink color conversion processing is performed. In this step, the image data constituted by R', G', and B' represented by 8 bits for each of them, which has been subjected to the input color conversion processing in step S301, is converted into image data based on color signal data of the ink used in the printer 100. In the present exemplary embodiment, since the image is recorded using the black (K), cyan (C), magenta (M), and yellow (Y) ink, the image data constituted by the R, G, and B values is converted into image data constituted by K, C, M, and Y color signals represented by 8 bits for each of them. This ink color conversion processing is also performed by using a three-dimensional lookup table and using an interpolation calculation together therewith, similarly to the above-described input color conversion processing. A method such as the matrix calculation processing can also be employed as another conversion method, similarly to the input color conversion processing. Further, the four K, C, M, and Y colors have been cited as an example as the number of colors of ink used in the image recording, but other ink, such as light cyan (Lc) ink, light magenta (Lm) ink, and gray (Gy) ink, which are low in density, may be added.

Next, in step S303, tone reproduction curve (TRC) processing is performed. In this step, correction processing for adjusting the number of dots to be provided on the recording medium 106 in quantized data recording processing in step S307, which will be described below, is performed on the image data constituted by the C, M, Y, and K ink color signals represented by 8 bits for each of them, which has been subjected to the ink color conversion processing in step S302. This correction processing is performed for each ink color. The number of dots provided on the recording medium 106 and the optical density on the recording medium 106 that is realized by this number of dots are not in a linear relationship. Therefore, the number of dots to be provided on a unit region on the recording medium 106 is adjusted by correcting the image data constituted by C, M, Y, and K represented by 8 bits for each of them with the aim of establishing a linear relationship between the number of dots and the optical density. In the present exemplary embodiment, a one-dimensional lookup table (LUT) is used as a correction parameter when the TRC processing is performed.

Next, in step S304, head shading (HS) processing is performed. The printer 100 performs processing that inputs the image data constituted by the ink color signals and converts the 8-bit data for each ink color into image data constituted by an ink color signal according to an amount per ink droplet ejected from each of the nozzles forming the recording head (an ejection amount). Examples of the method for converting the input data to the output data corresponding thereto include a method using a one-dimensional lookup table (LUT). In the present exemplary embodiment, the LUT is used as a correction parameter of an HS processing unit.

Next, in step S305, quantization processing is performed. In this step, the quantization processing is performed on the image data constituted by C, M, Y, and K represented by 8 bits or 256 values for each of them, which has been subjected to the HS processing in step S304. The quantization processing is generation processing for generating one-bit binary dot data indicating any of recording "1", which means that an ink droplet is provided, i.e., a dot is generated, and non-recording "0", which means that no ink droplet is provided, i.e., no dot is generated. The output of the quantization processing is not limited to the one-bit binary dot data indicating the recording "1" or the non-recording "0". For example, the output of the quantization processing may be the number of ink droplets to be provided per certain unit area, and may be output as ternary or more data in this case. In the present exemplary embodiment, the quantization processing will be described with reference to the example that generates the binary dot data indicating the recording "1" or the non-recording "0" for simplification of the description. Examples of the method for the quantization processing include the error diffusion method and the dither method, and any quantization method may be employed.

Next, in step S306, character data processing is performed. In this step, processing for maintaining the shape of the edge portion of an object for which emphasis is placed on the shape thereof, such as a character and a line, is performed on the image data after the quantization processing. The details of the processing will be described below.

Next, in step S307, the image is recorded by controlling the driving of the recording head to provide an ink dot of each of the colors on the recording medium 106 based on the binary data (the dot data) subjected to the character data processing in step S306.

The HS processing performed in step S304 will be described with reference to FIGS. 4A to 6C. FIG. 4A illustrates a nozzle array disposed on an ejection substrate of the recording head 101 for the black ink and arranged in the y direction. FIG. 4A illustrates only eight nozzles (401 to 408), which are a part of the plurality of nozzles arranged in the nozzle array, for simplification of the description and the illustration. FIG. 4B illustrates a dot layout pattern in which the ink dot ejected from each of the nozzles lands on the recording medium 106. A region 1061 on the left side in FIG. 4B is recorded using a nozzle group 1011 formed by four nozzles on the left side in FIG. 4A, and a region 1062 on the right side in FIG. 4B is recorded using a nozzle group 1012 formed by four nozzles on the right side in FIG. 4A. FIGS. 4A and 4B illustrate an ideal state, in which standard amounts of ink droplets are ejected from all the nozzles in standard directions, and equally-sized dots are recorded on the recording medium 106 at even intervals.

FIG. 4B illustrates a recorded state of a solid image at a recording duty of 50%. In the present example, when the recording duty is 100%, 8 dots are provided in each of the region 1061, including dots 411 to 414, and the region 1062, including dots 415 to 418. Since FIGS. 4A and 4B illustrate the state in which the image at the recording duty of 50% is recorded in each of the regions 1061 and 1062, eight dots are provided in each of the regions 1061 and 1062. In the present example, the equally-sized dots are laid out at the even intervals and creates the ideal landing state. Therefore, the region 1061 and the region 1062 are recorded at the same density with respect to inputs of color signals having the same value.

In FIGS. 4A and 4B, the size of each individual nozzle and the size of the dot recorded by each of the nozzles on the recording medium 106 are represented by equally-sized circles. They are illustrated in this manner to clarify their correspondence for convenience of the description, and their sizes are not equal to each other actually. Further, besides the nozzle diameter, there is also another possible cause for the difference in the ink amount ejected from each of the nozzles. Therefore, although the nozzle diameter is not necessarily different when the ejected ink amount is different, the following description will continue indicating a nozzle corresponding to a great ejection amount by a large circle for simplification of the description.

Next, FIGS. 5A and 5B illustrate the recording head 101 and a dot layout pattern at a duty of 50% that is ejected on the recording medium 106, similarly to FIGS. 4A and 4B. In the present example, assume that standard amounts of ink droplets are ejected from four nozzles 501 to 504 on the left side and larger amounts of ink droplets than the standard amount are ejected from four nozzles 505 to 508 on the right side among eight nozzles arranged on the recording head 101. When there is a variation in the amount of ink droplet ejected from each of the nozzles (the ejection amount) in the recording head in use, like the recording head 101 illustrated in FIGS. 5A and 5B, the density may be different depending on a region on the recording medium 106 even when the ink is provided based on image data indicating the same color. In the example illustrated in FIGS. 5A and 5B, a solid image at the standard density is recorded in a region 1063 recorded using a nozzle group 1013 formed by the nozzles 501 to 504 corresponding to the standard ejection amount. On the other hand, a solid image at a density higher than the standard density is recorded in a region 1064 recorded using a nozzle group 1014 formed by the nozzles 505 to 508 corresponding to the ejection amount larger than the standard ejection amount. In other words, a difference is generated between the density of the image recorded on the region 1063 and the density of the image recorded on the region 1064.

In this manner, when the image is recorded using the recording head including nozzles having different ejection characteristics from each other, a difference is generated in density per region in the image to be recorded. To improve this situation, the density difference can be reduced by correcting the image data by the above-described HS processing. This will be described with reference to FIGS. 6A to 6C. The correction is made to image data corresponding to a nozzle group formed by nozzles 605 to 608 corresponding to an ejection amount larger than the standard ejection amount, among the nozzles on the recording head 101, so as to reduce the density of the image to be recorded. More specifically, the image data is generated in such a manner that a smaller number of dots will be provided on the recording medium 106 by the nozzles 605 to 608 than the number of dots provided on the recording medium 106 by nozzles 601 to 604. In the present exemplary embodiment, the HS processing is performed on the image data constituted by C, M, Y, and K based on 8 bits or 256 values for each of them, and, as a result thereof, the image data is generated in such a manner that the number of dots will reduce in the binary dot data subjected to the quantization processing after the HS processing.

FIG. 6B illustrates a dot layout on the recording medium 106 after the HS processing is performed on the image data for recording an image at a recording duty of 50% in each of a region 1065 and a region 1066. A dot 611, a dot 612, a dot 613, and a dot 614 are recorded by the nozzle 601, the nozzle 602, the nozzle 603, and the nozzle 604, respectively, in the region 1065.

Now, hypothetically suppose that the area on the recording medium 106 that is covered with the dots ejected from the four nozzles on the right side (the nozzles 605 to 608) is twice as large as the area on the recording medium 106 that is covered with the dots ejected from the four nozzles on the left side (the nozzles 601 to 604). The covered areas on the recording medium 106 can be approximately equalized by correcting the number of times of ejection from the four nozzles on the right side (the nozzles 605 to 608) into approximately a half of the number of times of ejection from the four nozzles on the left side (the nozzles 601 to 604), i.e., reducing the number of dots by half by the above-described HS processing. In the case of FIG. 6B, the data is generated in such a manner that eight dots will be provided in the region 1065 while four dots will be provided in the region 1066.

FIG. 6C illustrates an example of the graph based on the correction tables used in the HS processing according to the present exemplary embodiment. The horizontal axis represents the input value (INPUT) and the vertical axis represents the output value (OUTPUT), and both of them represent tone values between 256 tones. When the same value is input, the output value of a correction table graph B used when the ejection amount is larger than the standard amount is smaller than the output value of a correction table graph A used when the ejection amount is the standard amount. This indicates that the data is adjusted in such a manner that, when the ejection amount is large, the tone value for 256 tones is corrected to a smaller value, as a result of which the number of dots will reduce.

In this manner, in the HS processing, the number of dots to be provided is adjusted in such a manner that the density is kept approximately even in each of the regions in the image recorded on the recording medium 106 based on the image data indicating an even color. The HS processing has been described based on the example that the detected density of the image is halved by reducing the number of dots covering twice the area by half in the present exemplary embodiment, but the relationship between the area covered with the dots and the detected density is not necessarily a proportional relationship actually. Therefore, it is desirable to research in advance the relationship between the density and the number of dots of the image recorded using each of the nozzle groups by, for example, recording a test pattern.

In the above-described manner, in the HS processing, the number of dots to be provided is adjusted based on the ejection characteristics of the nozzles corresponding to each of the regions. As a result, these regions are observed to be in approximately the same color, provided that the densities observed according to the optical absorption characteristics of these regions are the same as each other. The variation in the ejection characteristic of each of the nozzles may also occur in a multi-value recording apparatus capable of changing the sizes of dots, such as a quaternary recording apparatus that records an image using three levels of dots, a large dot, an intermediate dot, and a small dot. Even in such a case, the densities can be equalized by employing the above-described HS processing and adjusting the number of dots and the sizes thereof. The HS processing has been described based on the example in which four nozzles are included in one nozzle group in the present exemplary embodiment, but the number of nozzles is not limited thereto. The image data can also be corrected nozzle by nozzle, provided that the resolution of the image data in the y direction is equal to or higher than the nozzle resolution.

Now, an issue addressed by the present disclosure will be described. The image quality may be deteriorated by adjusting the number of ink dots to be ejected to reduce the density difference in the recorded image as described above. In the case of an object such as a character or a line drawing, the edge shape becomes ragged, failing to maintain the linearity.

For example, suppose that the adjustment for reducing the number of dots is made to image data to be recorded by a nozzle that ejects a large amount of ink droplet. As a result thereof, the line recorded using a nozzle that ejects a small amount of ink droplet is formed with a linearly ejected ink droplet, thereby being recorded as a high-quality line. On the other hand, the line recorded using the nozzle corresponding to the large ejection amount is formed with a reduced number of dots to reduce the density difference, thereby exhibiting the impaired linearity at the edge portion and thus undesirably reducing in quality.

With the aim of addressing such an issue, the present exemplary embodiment carries out the recording so as to prevent the deterioration of the qualities of the character and the line drawing while performing the processing for reducing the density difference.

Figure 7A:
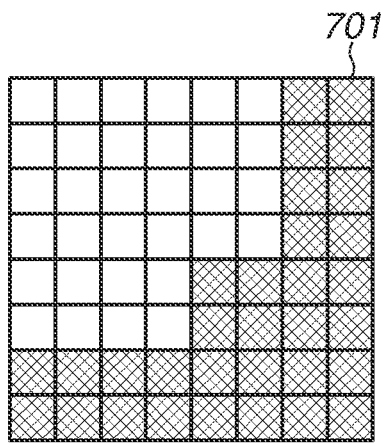
FIGS. 7A to 7E illustrate a general concept of character data processing.

FIGS. 7A to 7E illustrate a general concept for facilitating a better understanding of the character data processing performed in step S306. FIG. 7A illustrates image data 701 input in step S301, and assume that an individual grid is set at 1200 dpi for each of them. Hatched pixels indicate that the RGB values are (0, 0, 0), and pixels illustrated in white indicate that the RGB values are (255, 255, 255). The input image data 701 is processed according to the flow described with reference to FIG. 3.

Figure 7B:
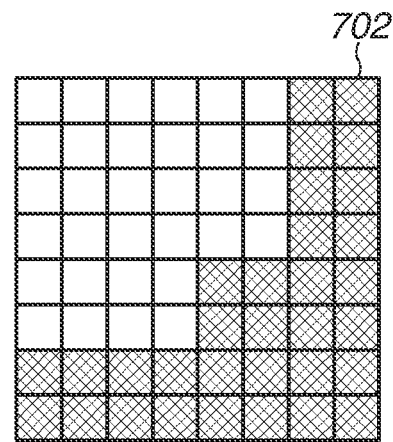

In FIG. 7B, image data 702 is formed in a case where the image is recorded using a nozzle group corresponding to the standard ejection amount like the nozzle group 1013 illustrated in FIG. 5A, and is binary dot data subjected to the HS processing in step S304 and the quantization processing in step S305. Now, it is understood that the image data 701 and the image data 702 are identical image data.

Figure 7C:
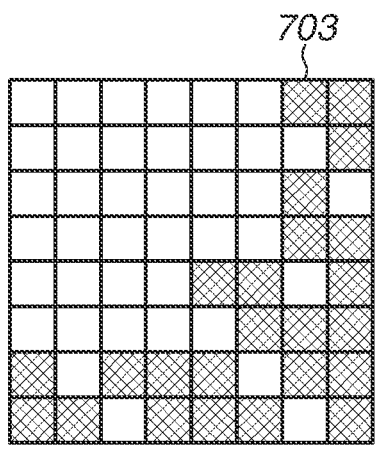

In FIG. 7C, image data 703 is formed in a case where the image is recorded using a nozzle group corresponding to an ejection amount larger than the standard amount like the nozzle group 1014 illustrated in FIG. 5A, and is binary dot data subjected to the HS processing and the quantization processing similarly to FIG. 7B. As described above, the number of ink droplets to be ejected is adjusted by the HS processing for equalizing the densities, and the hatched pixels indicating the recording are placed at different positions from the image data 702. In this manner, even if a pixel indicates that the ink is provided, in the original image data, this pixel may be excluded by the HS processing and changed to a pixel indicating that the ink is not provided. When the edge portion of a character or a line drawing is subjected to such processing for changing the pixel from the pixel at which the ink should be provided to the pixel at which the ink is not provided, this raises an issue that the edge cannot be linearly formed on the recording medium 106 and becomes ragged, leading to the deterioration of the character quality or the line quality.

With the aim of addressing such an issue that the quality of an object such as a character or a line drawing is undesirably deteriorated due to the HS processing, the present exemplary embodiment performs such processing that the color signal of the pixel corresponding to the edge is increased/reduced to a degree lower than the degree to which the color signal of the pixel corresponding to a non-edge is increased/reduced. More specifically, in the present exemplary embodiment, first, edge information, which indicates the edge pixel in the image data before the HS processing is performed, is acquired in the character data processing in step S306. Then, the image data after the HS processing is subjected to processing for changing the pixel indicating that the ink is not provided, among pixels corresponding to the edge portion in the image, so that this pixel becomes the pixel indicating that the ink is provided. As a result, it is possible to reduce the influence of the processing that reduces the number of dots to be provided at the edge of an object such as a character or a line drawing due to the HS processing to allow the edge to be linearly formed, thereby preventing the deterioration of the quality of the character and the quality of the line drawing.

Figure 7D:
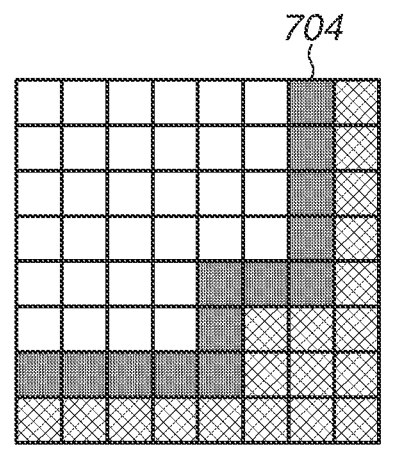

More specifically, first, information indicating the pixel corresponding to the edge (the edge information) is acquired in the image data before the HS processing is performed. This edge information can be generated, for example, using an edge detection method such as the Fourier transform from the image data 701 input in step S301. A little changing portion (a low-frequency component) and a considerably changing portion (a high-frequency component) are extracted by applying the Fourier transform to the image data 701. The pixel value considerably changes at the edge portion, and therefore it can be estimated that the edge portion is intensively present at the high-frequency component. Therefore, the edge in the image can be detected by extracting only the high-frequency component after the Fourier transform. Another employable method is a method that generates the edge information based on attribute data input as an attachment to the image data 701 when the image data 701 is input in step S301. Image data 704 illustrated in FIG. 7D is the image data 701 illustrated in FIG. 7A with the edge portion detected therein, and pixels blacked out therein (black pixels) correspond to the edge portion.

Next, the pixel at which the ink is not provided, i.e., the pixel indicating the non-recording "0" is detected among the pixels corresponding to the edge portion based on the acquired edge information. The pixel that is the pixel corresponding to the edge portion and has the pixel value indicating the non-recording "0" is the pixel excluded by the HS processing. Then, the processing for changing the pixel value of the detected pixel indicating the non-recording "0" to the recording "1" is performed.

Figure 7E:
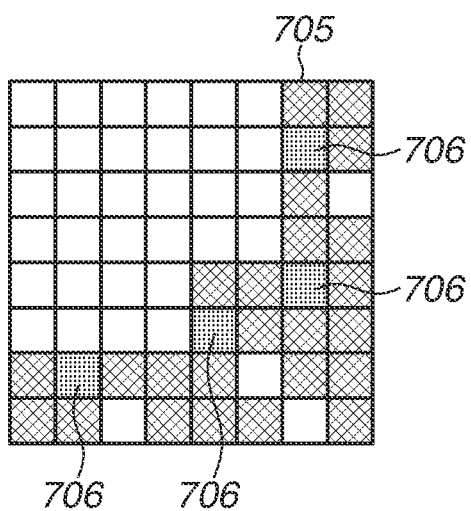

The processing will be described with reference to the example illustrated in FIGS. 7A to 7E. The pixel indicating the non-recording "0" (the pixel indicated in white), among the pixels corresponding to the pixels at the edge portion (the black pixels) in the image data 704, is detected in the image data 703 after the HS processing. Then, the value of the detected pixel is changed to the recording "1" indicating that the ink is provided. FIG. 7E illustrates image data 705 subjected to the character data processing. Pixels 706 in FIG. 7E indicate the pixels corresponding to the edge portion that are changed from the non-recording "0" to the recording "1" by the present processing.

The pixel having the pixel value indicating the recording "1" is not changed. Further, the present processing is not performed regarding the pixel corresponding to the non-edge portion other than the edge. This means that the pixel value is kept at the non-recording "0" for the pixel corresponding to the non-edge portion that has been excluded by the adjustment of the number of dots in the HS processing.

Performing the character data processing working in this manner leads to the ink provision at the pixel corresponding to the edge portion that has been excluded by the HS processing, thereby allowing the image to be recorded with a high-quality character or a high-quality line drawing without the chipped edge.

It is also effective to apply the character data processing in the case of such a multi-value recording apparatus that the sizes of the dots can be controlled at the plurality of levels, like the above-described example. For example, if recording data based on three values, the non-recording "0", the recording (small) "1", and the recording (large) "2" is generated after the quantization, the edge in the image can be prevented from being ragged by changing the pixel value of the pixel indicating "0" or "1", among the pixels corresponding to the edge portion, to "2" based on the edge information.

Further, the present exemplary embodiment has been described regarding the example in which a blank space (white paper) of the recording medium 106 is set as the background and the region with the ink provided thereon is set as the character region, but the above-described processing can also be performed on a so-called outlined character formed by providing the ink in the background portion and setting the blank space as the character region. In the case of the outlined character, a pixel adjacent to the character region is detected as the edge, and therefore the quality of the edge of the outlined character is determined based on the quantity of the edge of the adjacent pixel. As a result, the above-described method can also bring about a similar advantageous effect for the outlined character.

A second exemplary embodiment will be described. The first exemplary embodiment has been described based on the example in which the image data at the resolution of 1200 dpi that is the same as the recording resolution is input and each image process is performed at the same resolution, when the processing illustrated in FIG. 3 is performed. However, the image processing undesirably imposes a heavy processing load if being performed at a resolution that is the same as the recording resolution in conformity with the nozzle resolution as high as 1200 dpi or 2400 dpi. Therefore, the present exemplary embodiment will be described regarding the example in which the image processing as far as the quantization processing in step S305 is performed at a resolution lower than the recording resolution. In this example, the image data is processed at a resolution of 600 dpi as far as the quantization processing, and, after that, is subjected to index development processing so as to match the nozzle resolution of 1200 dpi. At this time, the present exemplary embodiment uses multi-value quantization that determines a recording amount of the dot to be recorded at one pixel in 600 dpi by holding the output result of the quantization processing as multi-valued data.

Figure 8:
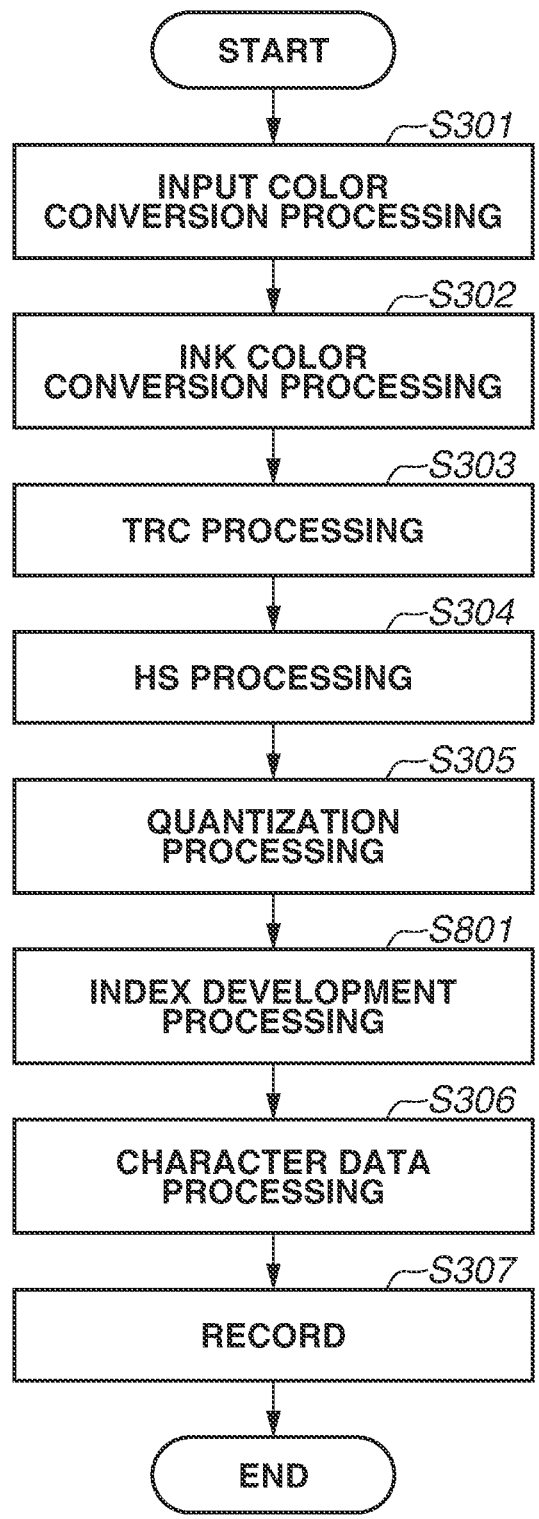
FIG. 8 is a flowchart illustrating an image processing configuration according to a second exemplary embodiment.

FIG. 8 is a flowchart illustrating image processing according to the present exemplary embodiment. This flowchart is different from the flowchart illustrated in FIG. 3 according to the first exemplary embodiment in that the index development processing is performed as step S801 between the quantization processing in step S305 and the character data processing in step S306.

First, image data at 600 dpi×600 dpi is input, and is subjected to each of the processes from the input color conversion processing in step S301 to the HS processing in step S304. The content of the processing is the same as that of the first exemplary embodiment, although the resolution is different therefrom.

In step S305, the quantization processing is performed. The result of the quantization processing is output as the one-bit binary dot data indicating the recording "1" or the non-recording "0" in the first exemplary embodiment, but is output as multi-valued data indicating the number of ink droplets to be provided at each pixel in the present exemplary embodiment. For example, in the case of a recording apparatus that provides up to four dots of ink droplets at one pixel in 600 dpi×600 dpi, the output of the quantization processing is controlled based on five values, "0", "1", "2", "3", and "4". Generally, the error diffusion method and the dither method are known as the quantization processing, but the quantization processing in the present example will be described based on the multi-level dither method that quantizes the input image into three values, "0", "1", and "2" by way of example.

Figure 9A:
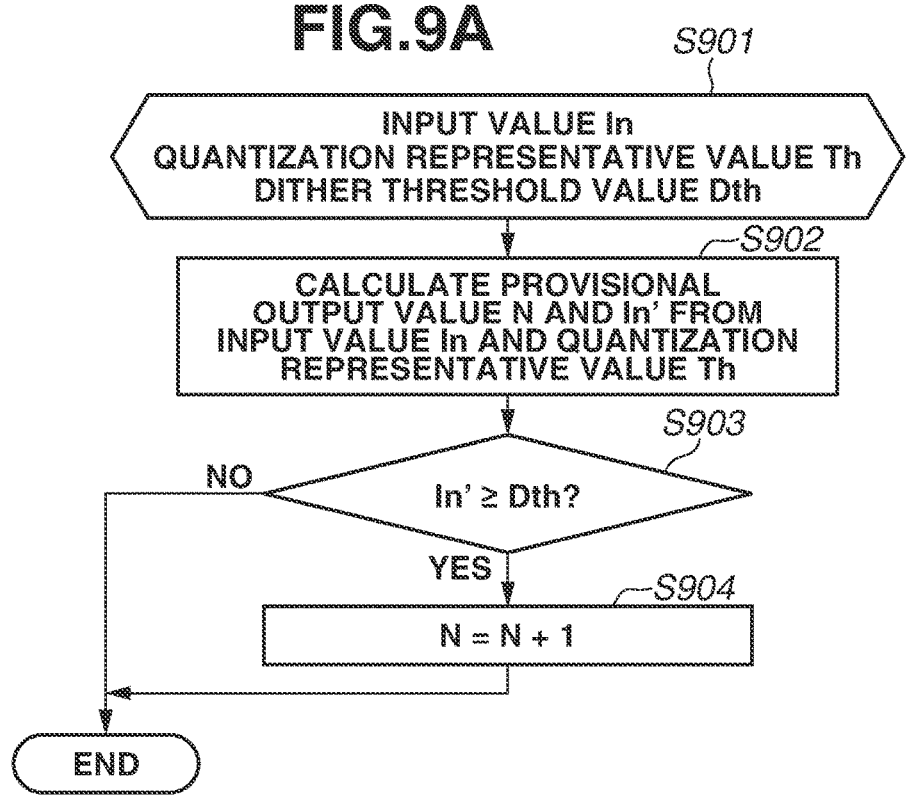
FIGS. 9A and 9B illustrate quantization processing using the multi-level dither method.
Figure 9B:
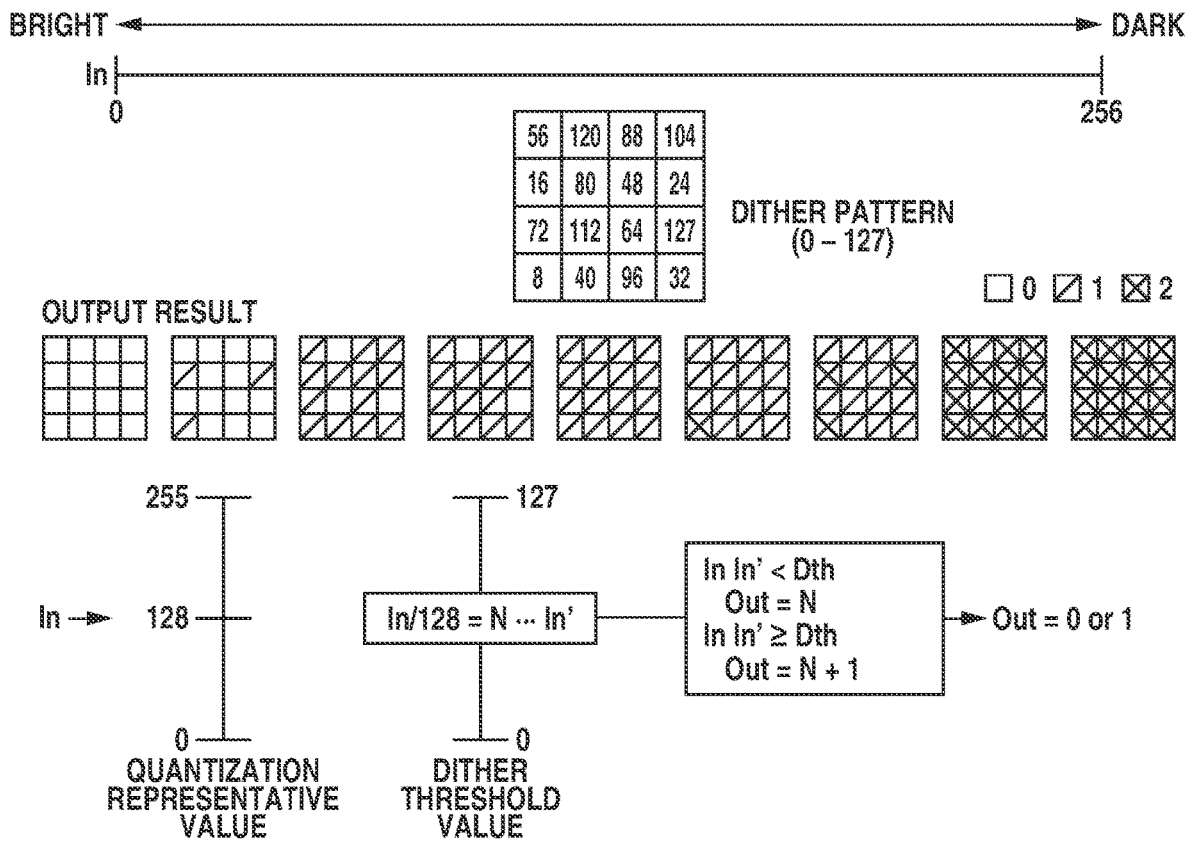

FIGS. 9A and 9B illustrate the quantization processing using the multi-level dither method according to the present exemplary embodiment. FIG. 9A is a flowchart illustrating the multi-level dither method to be generally practiced. FIG. 9B illustrates an output result when the input image is quantized by the multi-level dither method to be generally practiced using a dither pattern in which dither threshold values of 0 to 127 are arranged at 4×4 pixels with respect to nine tones among input values 0 to 255.

In step S901, an input value In, a dither threshold value Dth, and a quantization representative value Th are prepared in advance. The input value In is the value of each pixel in the image data input in step S301.

Next, in step S902, the input value In and the quantization representative value Th are compared with each other. Now, the quantization representative value Th is 0, 128, and 255, and the input value In is classified into any of two ranges, 0 to 127 and 128 to 255. Because the two ranges defined by the quantization representative value Th are equal in size, the calculation at this time can be expressed by an equation (1).

$$In/128 = N \ldots In'$$  Equation (1)

N is a quotient of the calculation equation, and is a provisional output value (a natural number). In the present example, 0 or 1 is acquired as N. In' is a remainder of the calculation equation. In the present example, the provisional output value N is 0 if the input value In falls within 0 to 127, and is 1 if the input value In falls within 128 to 255. In a case where the two ranges are not equal in size, which region the input value In belongs to is determined by sequentially comparing the quantitative representative value Th and the input value In in order instead of using the equation (1).

In step S903, In' calculated from the equation (1) and the dither threshold value Dth are compared with each other.

Then, in step S904, +1 is added to N based on a result thereof. This determination processing is performed as expressed by an equation (2)

When the comparison results in $In' < Dth$, $N=N$

When the comparison results in $In' \geq Dth$, $N=N+1$  Equation (2)

For example, if the input value In is 28, the equation (1) is 28/128=0 . . . 28, and therefore yields N=0 and In'=28. Then, this result is compared with the dither threshold value Dth of the corresponding pixel, and any of 0 and 1 is determined to be the output value. In the case of the example illustrated in FIG. 9B, this corresponds to the output result of the second from the left.

Similarly, if the input value In is 158, the equation (1) is 158/128=1 . . . 30, and therefore yields N=1 and In'=30. Then, this result is compared with the dither threshold value Dth of the corresponding pixel, and any of 1 and 2 is determined to be the output value. In the case of the example illustrated in FIG. 9B, this corresponds to the output result of the seventh from the left.

The image data quantized based on multiple values in step S305 in this manner is transmitted for the index development processing in step S801. In step S801, the quantized multi-valued data is developed into the binary recording data constituted by the recording "1" or the non-recording "0" indicating whether to provide the ink at each pixel. A technique can be used for the index development processing at this time. For example, the index development processing can be achieved by storing a dot layout according to the multi-valued quantized value as a table in advance and determining the dot layout based on the quantized value.

Then, in step S306, in a similar manner to the first exemplary embodiment, the character data processing is performed on the binary recording data processed by the index development processing in step S801. This causes the pixel value corresponding to the edge portion and indicating the non-recording "0" to be changed to the recording "1" and thus leads to the ink provision at this pixel, thereby reducing a chip in the edge and preventing the deterioration of the quality of the character and the quality of the line drawing.

A third exemplary embodiment will be described. In the above-described exemplary embodiment, the chip in the edge portion is reduced by performing the processing that detects the pixel at which the ink is not provided at the edge portion and changes the pixel value in such a manner that the ink is provided there as the character data processing after the HS processing. On the other hand, in the present exemplary embodiment, the chip in the edge due to the HS processing is reduced by employing different parameters when performing the HS processing on the edge portion and the non-edge portion using information indicating the ejection characteristic for each nozzle group corresponding to each region.

The first exemplary embodiment has been described as being configured to correct the image data constituted by the color signals according to the ejection characteristic of each of the nozzle groups forming the recording head when performing the HS processing. In this case, the ejection characteristic may be measured when the recording head is manufactured and stored in advance as the rank of the ejection characteristic, or the ejection characteristic may be estimated by recording a measurement image (a test pattern) containing a plurality of tones on a recording medium at an even density and referring to a measurement result of measuring this density. In the case where the plurality of recording heads corresponding to the plurality of colors of ink is used as illustrated in FIG. 1, the test pattern is recorded and the tone characteristic is measured with respect to each of the ink colors. Then, a tone characteristic to which the result of each tone characteristic is closest is searched for, and the ejection amount of this recording head is estimated.

The dot may also be excluded at the edge portion in the image and the edge may be undesirably chipped by adjusting the number of dots according to the ejection amount to reduce the difference in the record density in each of the regions on the recording medium as described in the above-described exemplary embodiment. One possible measure against this issue is to refrain from adjusting the number of dots at the edge portion and adjust the number of dots only at the non-edge portion, but refraining from adjusting the number of dots even when the ejection amount is large may undesirably result in a local overflow of the ink provided on the recording medium. Therefore, the present exemplary embodiment adjusts the number of dots to reduce the density difference due to the variation in ejection amount for the non-edge portion, and adjusts the number of dots according to the ejection amount while preventing the edge from being chipped for the edge portion. These adjustments of the numbers of dots for the non-edge portion and the edge portion use correction tables for outputting multi-valued data in response to an input of multi-valued image data, similarly to the first exemplary embodiment.

The correction table used for the edge portion can be determined in consideration of a parameter influential on the linearity of the edge in the image, such as the type of the ink of the printer, the ejection amount from each nozzle group, and a blur of the ink droplet according to the type of the recording medium. At this time, it is desirable to set such a correction table that the number of dots is adjusted within a range not causing an undesirable overflow of the ink provided on the recording medium. Setting the correction table so as to adjust the number of dots by a smaller amount (a smaller correction amount) than the correction table for the non-edge portion allows the density difference to be reduced among the regions corresponding to the respective nozzle groups while preventing the edge from being chipped.

Figure 10:
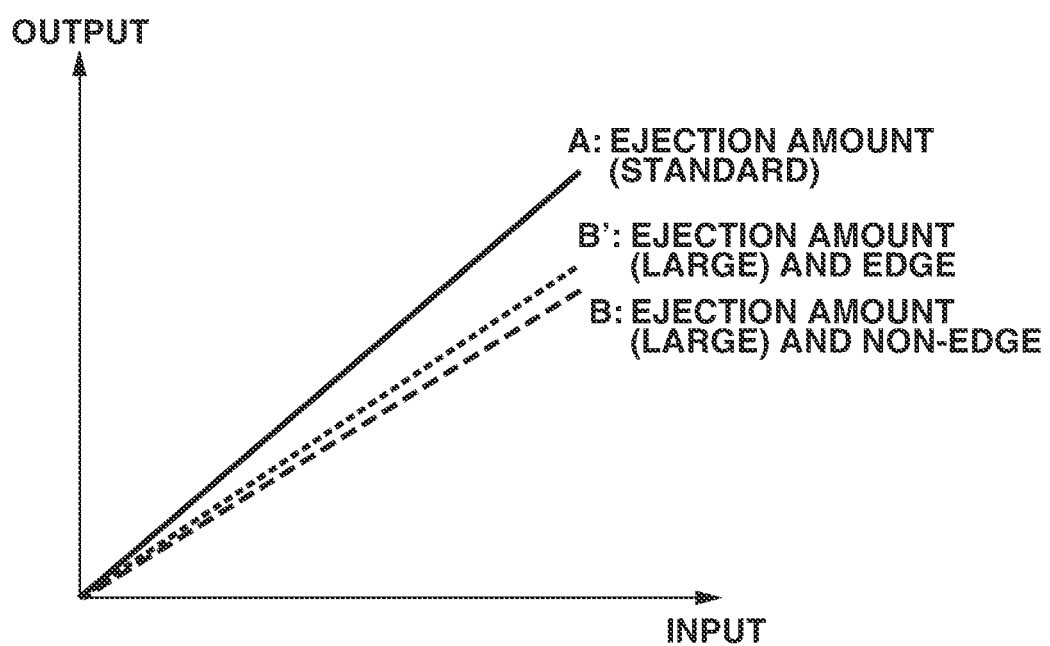
FIG. 10 illustrates head shading (HS) processing according to a third exemplary embodiment.

FIG. 10 illustrates an example of the graph based on the correction tables used in the HS processing according to the present exemplary embodiment. Similarly to FIG. 6C, when the same value is input, the output values of correction table graphs B and B' used when the ejection amount is larger than the standard amount are smaller than the output value of the correction table graph A used when the ejection amount is the standard amount. This indicates that the tone value for 256 tones is corrected to a smaller value when the ejection amount is large, as a result of which the data is adjusted in such a manner that the number of dots will reduce. Further, even when the ejection amounts (the large ejection amounts) are the same, the correction table graph B is used for the non-edge portion and the correction table graph B' is used for the edge portion. In other words, if both the edge portion and the non-edge portion are recorded using nozzle groups corresponding to the same ejection amount, a greater pixel value is output from the HS processing for the edge portion than for the non-edge portion even when the same pixel value is input as the pixel value of the edge portion and the pixel value of the non-edge portion. In sum, it can be said that the correction strength for the edge portion is lower than the correction strength for the non-edge portion. A goal, therefor, is to allow the correction to be carried out with emphasize placed on the reduction in the density difference for the non-edge portion, while making the edge chip due to the HS processing less likely to be generated while reducing the density difference for the edge portion, as described above.

In the above-described manner, in the present exemplary embodiment, the correction strength in the HS processing is changed between the edge portion and the non-edge portion based on the information indicating the result of the edge detection. As a result, it is possible to prevent the deterioration of the qualities of the character and the line drawing that accompanies the generation of the chip in the edge due to the correction while correcting the density difference due to the ejection characteristic for each nozzle group at the edge portion in the image.

A fourth exemplary embodiment will be described. The present exemplary embodiment will be described regarding a configuration that employs different correction amounts for the edge portion and the non-edge portion in the character data processing in step S306 using the ejection amount information used when the HS processing is performed.

The first exemplary embodiment has been described, pointing out that adjusting the number of dots in the HS processing can reduce the difference in the density for each region on the recording medium but excludes the dot even at the edge portion in the image to thus undesirably cause a chip in the edge when the ejection amount is large. Then, whether the pixel value is the recording "1" or the non-recording "0" is determined with respect to each pixel in the edge portion, and the pixel value is not changed if being the recording "1" and is changed to the recording "1" if being the not-recording "0" in the character data processing in step S306. In this case, when the recording heads have largely different ejection characteristics, making a change so as to add the dot excluded by the HS processing again may undesirably cause an ink leak locally at the edge in the image.

To address this issue, the present exemplary embodiment employs a correction method according to the ejection amount for the edge portion in the character data processing. For example, the present exemplary embodiment stores in advance a table that indicates a probability of changing the pixel value of the pixel indicating the non-recording "0" to the recording "1" according to the ejection characteristic. If the probability of the change is 80%, the processing for changing the pixel value to the recording "1" is performed on four pixels out of five pixels among the detected pixels indicating the non-recording "0". An ink leak more likely occurs on the recording medium as the ejection amount increases, and therefore the occurrence of the ink leak can be prevented by setting the probability of changing the pixel indicating the non-recording to the pixel indicating the recording to a lower value as the ejection amount increases. Further, a mask method may be employed as the method for controlling the probability regarding whether to change the pixel value.

According to the present disclosure, it becomes possible to carry out the recording so as to prevent the deterioration of the qualities of the character and the line drawing while reducing the density difference between the regions on the recording medium due to the ejection characteristics of the nozzles.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-141562, filed Jul. 31, 2019, which is hereby incorporated by reference herein in its entirety.

What is claimed is:

1. An image processing apparatus, wherein the image processing apparatus is configured to perform image processing for recording an image in a first region on a recording medium using a first nozzle group including a part of a plurality of nozzles arranged in a nozzle array in which the plurality of nozzles are configured to provide ink, and to perform image processing for recording an image in a second region different from the first region using a second nozzle group including a nozzle different from the part of the plurality of nozzles in the first nozzle group, the image processing apparatus comprising:
a processing unit configured to perform conversion processing to convert first input data of the image to be recorded in the first region and second input data of the image to be recorded in the second region to reduce a difference between a density of the image recorded in the first region using the first nozzle group with respect to an input of a predetermined color signal and a density of the image recorded in the second region using the second nozzle group with respect to the input of the predetermined color signal, and configured to perform generation processing for generating dot data indicating a position of a dot to be generated in each of the first region and the second region based on the dot data after the conversion processing; and
an acquisition unit configured to acquire edge information indicating a pixel corresponding to a first edge of an object in the image to be recorded in the first region and indicating a pixel corresponding to a second edge of the object in the image to be recorded in the second region, wherein, based on the acquired edge information, the processing unit performs the conversion processing and the generation processing in such a manner that a color signal of an edge pixel corresponding to an edge is increased/reduced to a degree lower than a degree to which a color signal of a non-edge pixel corresponding to a non-edge of the object is increased/reduced.

2. The image processing apparatus according to claim 1, wherein, in a case where a conversion for outputting a color signal having a value smaller than a value of the input predetermined color signal is carried out in the conversion processing, the processing unit performs conversion processing to convert data, from data on the edge pixel and indicating that the dot is not generated, to data indicating that the dot is generated by the generation processing based on the converted data and the acquired edge information.

3. The image processing apparatus according to claim 1, wherein the processing unit performs processing such that the edge pixel in an output color signal has a value greater than a value of the non-edge pixel in a case where a conversion by the conversion processing for outputting a color signal having a value smaller than a value of the input predetermined color signal is carried out based on the acquired edge information.

4. The image processing apparatus according to claim 1, wherein the edge information is acquired based on data before the conversion processing is carried out by the conversion unit.

5. The image processing apparatus according to claim 1, wherein the processing unit performs conversion processing to convert data of the image to be recorded in the first region based on information indicating an ejection characteristic of the first nozzle group and convert data of the image to be recorded in the second region based on information indicating an ejection characteristic of the second nozzle group.

6. The image processing apparatus according to claim 5, wherein the information indicating the ejection characteristic of the first nozzle group is acquired based on a result of measurement of a measurement image recorded using the first nozzle group, and the information indicating the ejection characteristic of the second nozzle group is acquired based on a result of measurement of the measurement image recorded using the second nozzle group.

7. The image processing apparatus according to claim 1, wherein the conversion processing unit converts data, from data on the edge pixel and indicating that the dot is not generated, to data indicating that the dot is generated in the generation processing with a predetermined probability.

8. The image processing apparatus according to claim 1, wherein data output from the conversion processing is ternary or more multi-valued data.

9. The image processing apparatus according to claim 1, wherein the part of the plurality of nozzles in the first nozzle group is not included in the second nozzle group.

10. The image processing apparatus according to claim 1, further comprising a recording head provided with a nozzle array including the first nozzle group and the second nozzle group.

11. A method for an image processing apparatus, wherein the image processing apparatus is configured to perform image processing for recording an image in a first region on a recording medium using a first nozzle group including a part of a plurality of nozzles arranged in a nozzle array in which the plurality of nozzles are configured to provide ink, and to perform image processing for recording an image in a second region different from the first region using a second nozzle group including a nozzle different from the part of the plurality of nozzles in the first nozzle group, the method comprising:

performing conversion processing to convert first input data of the image to be recorded in the first region and second input data of the image to be recorded in the second region to reduce a difference between a density of the image recorded in the first region using the first nozzle group with respect to an input of a predetermined color signal and a density of the image recorded in the second region using the second nozzle group with respect to the input of the predetermined color signal, and performing generation processing for generating dot data indicating a position of a dot to be generated in each of the first region and the second region based on the dot data after the conversion processing; and acquiring edge information indicating a pixel corresponding to a first edge of an object in the image to be recorded in the first region and indicating a pixel corresponding to a second edge of the object in the image to be recorded in the second region, wherein, based on the acquired edge information, processing includes performing the conversion processing and performing the generation processing in such a manner that a color signal of an edge pixel corresponding to an edge is increased/reduced to a degree lower than a degree to which a color signal of a non-edge pixel corresponding to a non-edge of the object is increased/reduced.

12. The method according to claim 11, wherein, in a case where a conversion for outputting a color signal having a value smaller than a value of the input predetermined color signal is carried out in the conversion processing, performing includes performing conversion processing to convert data, from data on the edge pixel and indicating that the dot is not generated, to data indicating that the dot is generated by the generation processing based on the converted data and the acquired edge information.

13. The method according to claim 11, wherein performing includes performing processing such that the edge pixel in an output color signal has a value greater than a value of the non-edge pixel in a case where a conversion by the conversion processing for outputting a color signal having a value smaller than a value of the input predetermined color signal is carried out based on the acquired edge information.

14. A non-transitory computer-readable storage medium storing a program to cause a computer to perform a method for an image processing apparatus, wherein the image processing apparatus is configured to perform image processing for recording an image in a first region on a recording medium using a first nozzle group including a part of a plurality of nozzles arranged in a nozzle array in which the plurality of nozzles are configured to provide ink, and to perform image processing for recording an image in a second region different from the first region using a second nozzle group including a nozzle different from the part of the plurality of nozzles in the first nozzle group, the method comprising:

performing conversion processing to convert first input data of the image to be recorded in the first region and second input data of the image to be recorded in the second region to reduce a difference between a density of the image recorded in the first region using the first nozzle group with respect to an input of a predetermined color signal and a density of the image recorded in the second region using the second nozzle group with respect to the input of the predetermined color signal, and performing generation processing for generating dot data indicating a position of a dot to be generated in each of the first region and the second region based on the dot data after the conversion processing; and acquiring edge information indicating a pixel corresponding to a first edge of an object in the image to be recorded in the first region and indicating a pixel corresponding to a second edge of the object in the image to be recorded in the second region, wherein, based on the acquired edge information, processing includes performing the conversion processing and performing the generation processing in such a manner that a color signal of an edge pixel corresponding to an edge is increased/reduced to a degree lower than a degree to which a color signal of a non-edge pixel corresponding to a non-edge of the object is increased/reduced.

* * * * *